United States Patent [19]
Fitz

[11] Patent Number: 5,281,066
[45] Date of Patent: Jan. 25, 1994

[54] SEGMENTED ROD USED FOR BONDING TWO ADJACENT PLANAR SURFACES

[76] Inventor: Leslie Fitz, 1483 Alameda de les Pulgas, San Carlos, Calif. 94070

[21] Appl. No.: 946,583

[22] Filed: Sep. 18, 1992

Related U.S. Application Data

[62] Division of Ser. No. 820,845, Jan. 15, 1992, Pat. No. 5,174,007.

[51] Int. Cl.⁵ .......................... F01B 9/10; F16B 33/00; F16B 35/00
[52] U.S. Cl. .................................. 411/378; 411/385; 411/424
[58] Field of Search ............... 411/378, 383, 385, 424, 411/2

[56] References Cited

U.S. PATENT DOCUMENTS

| | | |
|---|---|---|
| 2,011,484 | 8/1935 | Harman . |
| 2,121,692 | 6/1938 | Hays . |
| 2,247,499 | 7/1941 | Hutchison, Jr. ..................... 411/378 |
| 2,289,785 | 7/1942 | Hutchison, Jr. ..................... 411/378 |
| 2,302,621 | 11/1942 | Luboshez ............................ 411/378 |
| 2,361,701 | 10/1944 | Michaels . |
| 2,998,645 | 9/1961 | Diperstein . |
| 3,528,466 | 9/1970 | Tracy ............................. 411/383 X |
| 4,599,781 | 7/1986 | Diperstein . |
| 4,845,828 | 7/1989 | Reed . |

FOREIGN PATENT DOCUMENTS

| | | | |
|---|---|---|---|
| 1290562 | 9/1972 | United Kingdom | ................ 411/378 |
| 2115510 | 9/1983 | United Kingdom | ................ 411/378 |

*Primary Examiner*—Timothy V. Eley
*Attorney, Agent, or Firm*—Richard C. Litman

[57] ABSTRACT

A method and apparatus for patching a hole in a panel without the use of a bonding agent or the aid of a welding apparatus. The method encompasses the placing of a patch within the confines of a hole. The patch is of a configuration which is within a close tolerance of the hole and of the same thickness as the thickness of the panel. This provides a flush inside surface and a flush outside surface upon the completion of the repair. The patch is temporarily secured with supports and bores are drilled around the periphery of the patch which communicate with both the patch and the panel. These bores are tapped to accommodate a segmented threaded rod. The depth or thickness of each threaded segment is almost equivalent to the thickness of the panel. The segmented threaded rod is threaded into the hole until it is flush with the inside surface. Each consecutive segment is separated by a core. The segmented threaded rod is cut off at the core substantially flush with the panel surface, the segment threads are fouled and/or secured by adhesive to the threads of the tapped panel/patch hole, and then the surface(s) of the segment are ground to a flush finish with the panel surface(s). This series of steps is repeated until the patch is secure.

4 Claims, 5 Drawing Sheets

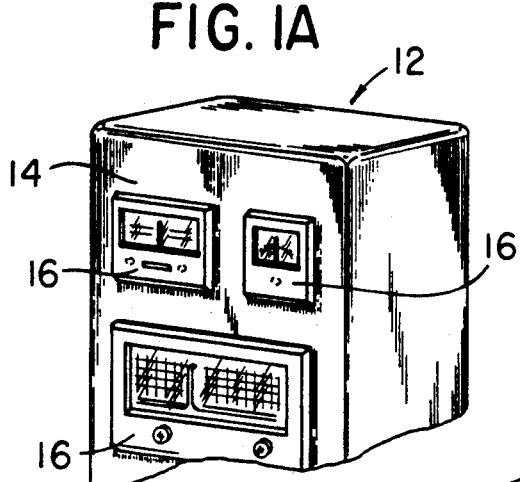
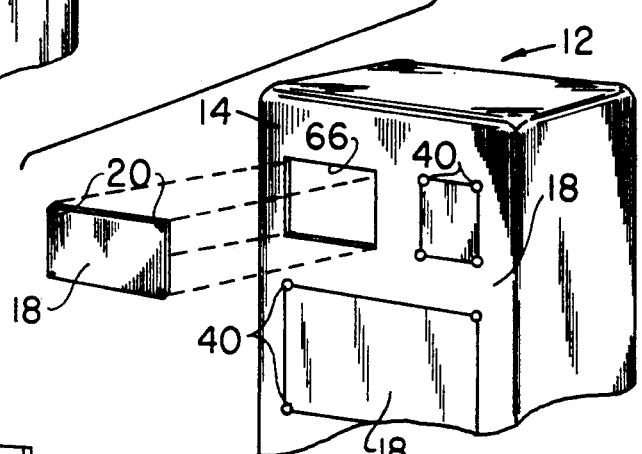
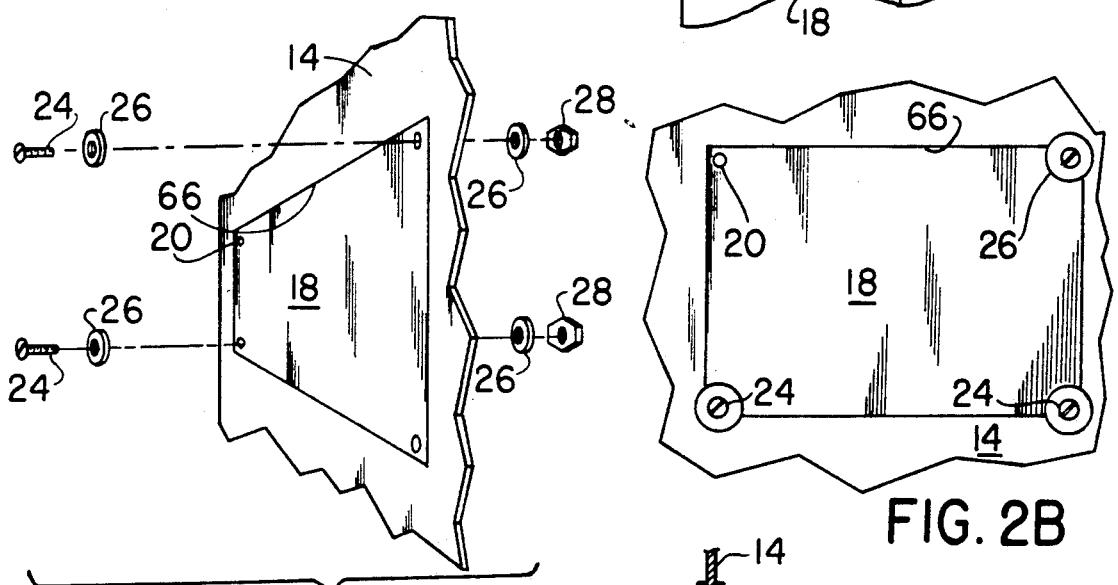
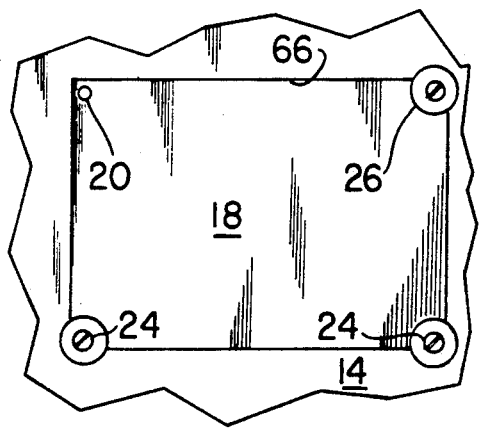
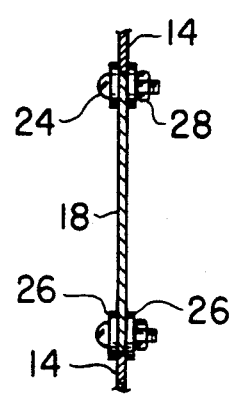

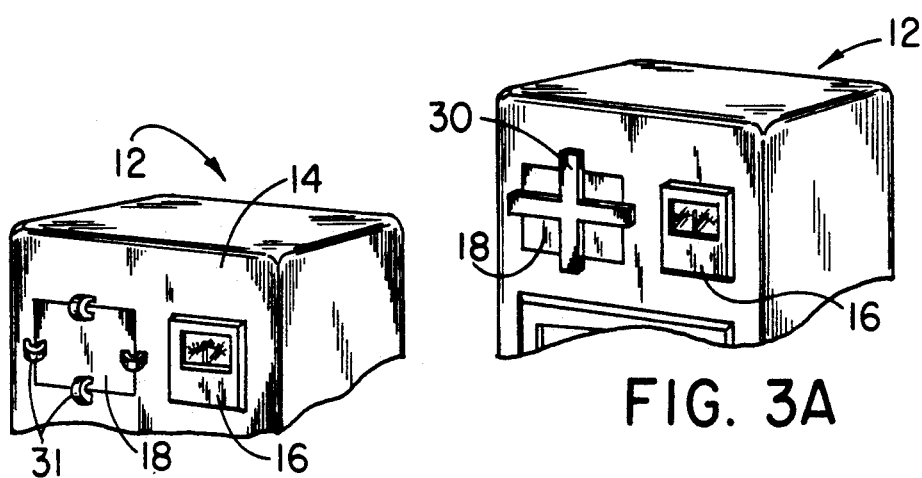
FIG. 3A
FIG. 3B
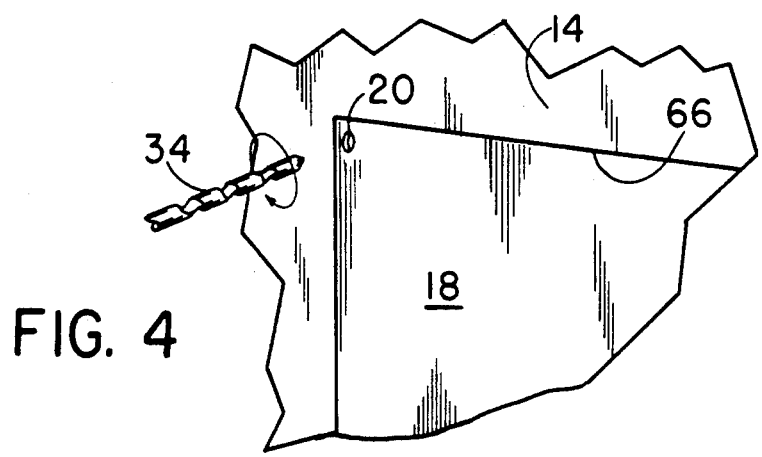
FIG. 4
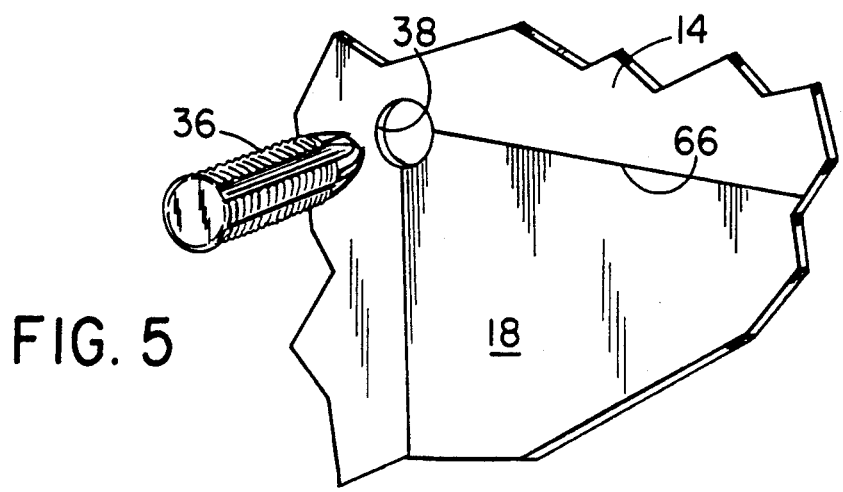
FIG. 5

SEGMENTED ROD USED FOR BONDING TWO ADJACENT PLANAR SURFACES

This is a division of Ser. No. 820,845, filed Jan. 15, 1992, now U.S. Pat. No. 5,174,007.

BACKGROUND OF THE INVENTION

1. Field of the Invention

The present invention relates to a method and apparatus for patching a hole and more particularly, for patching a hole in an instrument console panel. This method and apparatus provides a patch that is flush with both the inner surface and the outer surface of the panel.

2. Description of Prior Art

Welding as a method of patching a hole in a panel which houses highly sensitive electronics equipment can jeopardize the components and the operation of the circuitry. Welding or the use of adhesives to secure the patch in a hole may not be acceptable methods in the delicate environment of electronics equipment. A technique to patch a hole which does not produce excessive fumes, create undue heat, utilize a high current, or induce a strong magnetic field would be highly useful under such restrictive conditions.

U.S. Pat. No. 2,011,484 issued Aug. 13, 1935 to Hal W. Harman describes a method for repairing cracks in castings. A hole is drilled and tapped at one end of the crack and filled with a bolt. With the bolt screwed tightly into the hole, the head is sheared off flush with the casting. Another hole is drilled adjacent to and overlapping the previously filled hole. This hole is also tapped and filled with a bolt. The head of the bolt is again sheared off flush with the casting. This step is repeated along the crack, each hole adjacent to and overlapping the previously filled hole until the crack is filled. U.S. Pat. No. 2,121,692 issued Jun. 21, 1935 to Newell Hays discloses a method for closing cracks in a casting by drilling spaced holes in the casting along the line of the crack. The face of the casting is channeled so the holes are disposed along the center of the channel. The holes are tapped and screws are inserted into the holes. The heads of the screws are peened over to completely fill the channel. U.S. Pat. No. 2,361,701 issued Oct. 31, 1944 to Charles Michaels teaches a method for repairing a crack in a casting with contacting screws. A series of adjacent, angled holes are drilled, tapped and filled with contacting screws having heads projecting above the surface of the casting. The screw heads are then welded to fill the crack with metal. U.S. Pat. No. 2,998,645 issued Sep. 5, 1961 to David Diperstein demonstrates a method for repairing a crack in metal parts. A series of overlapping holes are drilled along the crack in the metal. Each hole is tapped to accommodate a bolt having a weakened point intermediate its length. The bolt is threaded into the hole and torque is applied to the bolt until it shears at the weakened point. This method requires a series of locks located across the crack to reduce the risk of widening of the crack.

U.S. Pat. No. 4,599,781 issued Jul. 15, 1986 to David Diperstein teaches a further a method of repairing cracks in thin metal parts, specifically ⅛ inch or less cast iron or ¼ inch or less aluminum. The steps of the method are about the same as in his earlier U.S. Pat. No. 2,998,645 just discussed and involve providing a series of holes along the crack, tapping each hole with a thread to mate with a plug, and filling the holes with the plugs by threading the plugs into the holes and applying torque to the plugs until the force of the torque applied exceeds the strength of the plugs whereby a portion of the plug snaps off beyond the surface of the crack. Precise dimensions and plug threading are mandatory for the method to work with thin metal plate. U.S. Pat. No. 4,845,828 issued Jul. 11, 1989 to Gary J. Reed illustrates yet another method of repairing a crack or break in a metal casting. A repair in a crack is performed in a manner whereby a series of holes are drilled, tapped, and plugged with a plug that breaks off at a "break-off" groove when a certain torque is reached. A particularly configured metal bar lock is required to hold the crack closed to prevent the crack from spreading. The metal bar lock fits in a recess in the casting. The recess is carved to conform to the peripheral contour of the bar lock except where semi-circular notches are located in the metal bar lock which correspond to semi-circular notches in the casting. When the metal bar lock is inserted into the recess, the notches in the casting line up with those in the metal bar lock for receiving a securing plug which is threaded thereinto until the torque applied exceeds the strength of the plug whereby the plug breaks off at the break-off point.

SUMMARY OF THE INVENTION

The instant invention provides a method which does not require securing the patch by the use of adhesives which produce vapors nor require the use of a welding apparatus which generates fumes and excessive heat, utilizes high currents, and induces a magnetic field. The method enables the user to temporarily secure a patch in a stable position during the course of installing permanent patch fasteners. The method provides inside and outside surfaces flush with the panel and patch once completed. A series of bores through adjacent panel and patch edges or corners are drilled and tapped and each is filled with a threaded segment which is partially cut and then broken off from a rod having a series of repair segments, each segment being substantially flush with the inside and outside surfaces of the patch and panel. Only minimal grinding is then required to complete the patching operation.

Accordingly, one object of the present invention is to provide a method for patching holes in a member, such as a panel, and more particularly, a method which does not require adhesives or the use of a welding apparatus to secure the patch in place.

Another object of the present invention is to provide a method for patching holes which vary in size, shape and thickness.

Another object of the present invention is to provide a method which produces a flush inside and outside surface about the area of the repair.

A further object of the invention is to provide a panel patching method which requires the use of only commonly available tools and parts, with the sole exception of a threaded segmented rod for providing threaded segments to secure a patch firmly within a panel hole or opening.

The above objects are accomplished in accordance with the present invention, a method and apparatus for patching a hole. A patch is cut which is of the same thickness and material as the panel containing the hole. The patch has a configuration which is within a close tolerance to the hole being patched. The patch is placed within the confines of the hole flush with the inside and outside surface of the panel. The patch is temporarily secured in place. Bores are drilled around the periphery of the repaired area, each bore communicating with both the panel and the patch. The bores are tapped with a thread to mate with segments of a segmented threaded rod. A segment is screwed into each bore and is broken off to provide a substantially flush surface both inside the panel and outside the panel. The transition between the thread of the panel and the thread of the patch is deformed, as by a punch, to foul the threads, thus preventing the segment from vibrating out over a period of time. Alternatively, an adhesive may be used to assure permanent attachment of the segment threads with the threads of the tapped holes. Or, an adhesive might be used on threads of some of the segments and others might be fouled as by a punch. Each segment is then ground smooth to provide a flush inside surface and a flush outside surface. With the temporary supports removed, the repair provides a flush surface inside and outside of the panel.

These and other features, advantages and objects of the invention will be more fully appreciated by the reference to the following detailed description and drawings.

BRIEF DESCRIPTION OF THE DRAWINGS

FIG. 1a is an environmental perspective view showing a console containing electronics components.

FIG. 1b is an environmental perspective view showing a console with the components removed and the holes being patched.

FIG. 2a is a partially exploded perspective view showing the preferred method of the present invention whereby a patch is temporarily secured.

FIG. 2b is elevational view showing the preferred method of the present invention whereby the patch is temporarily secured.

FIG. 2c is a cross-sectional view showing the preferred method of the present invention whereby the patch is temporarily secured.

FIG. 3a is a perspective view showing an alternative method of the present invention whereby then patch is temporarily secured with a T magnet.

FIG. 3b is a perspective view showing an alternative method of the present invention whereby then patch is temporarily secured with a plurality of horseshoe magnets.

FIG. 4 is a perspective view showing the method of the present invention whereby a hole or bore is drilled in the console adjacent to and overlapping a portion of the secured patch.

FIG. 5 is a perspective view showing the method of the present invention whereby the bore is tapped with a thread to mate with the threads on a segmented rod.

Similar reference characters denote corresponding features consistently throughout the attached drawings.

DETAILED DESCRIPTION OF THE PREFERRED EMBODIMENTS

Figure 6:
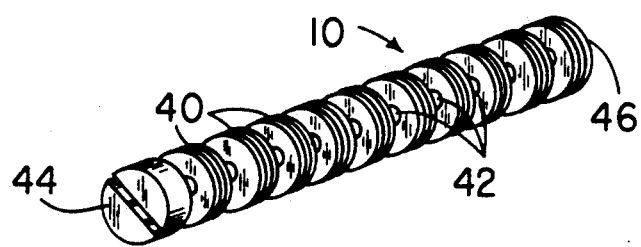
FIG. 6 is a perspective view of the segmented threaded rod according to the present invention.

Referring to FIGS. 1A and 1B, a console 12 is shown which contains instruments 16. The console 12 includes a front panel 14. Modifications in a console 12 may leave a hole 66 that an instrument 16 once occupied. The holes 66 are filled by providing a patch 18, preferably fabricated of the same material and being of the same thickness as the panel 14, and having a configuration within a close tolerance of the hole 66. This patch 18 fits into the hole 66 producing a flush inside surface and a flush outside surface for the front panel 14.

As shown in FIGS. 2A, 2B and 2C, the patch 18 is temporarily secured within the hole 66 with bolts 24, washers 26, and nuts 28, according the preferred method. Bores 20 are drilled completely through the patch 18 adjacent the periphery. A bolt 24 is inserted into a washer 26 which is large enough to overlap the transition between the patch 18 and the front panel 14 on the outside surface, and then inserted in the hole 20 and through another washer 26 adjacent the inside surface. A nut 28 is applied to the bolt 24 and fastened tightly to sandwich adjacent patch and panel areas between the washers 26. 26. Two remaining corners of the patch 18 are then secured in place in similar fashion, as seen in FIG. 2, with one bore 20 being left open. Thus, a plurality of bolts 24, washers 26, and nuts 28 temporarily but firmly secure patch 18 in the hole 66.

According to FIG. 3A, an alternative method may be incorporated to temporarily secure the patch 18 in the hole 66. One such method is the use of a cross magnet 30 attached to the patch 18 which extends across the periphery of patch 18 onto the front panel 14. A pair of cross magnets 30 such as these, one on the inside surface and one on the outside surface and attracted to one another temporarily secure the patch 18 in the hole 66. This alternative would be somewhat limited depending on the size of the hole 66 being repaired and the size and strength of the magnets 30.

As illustrated in FIG. 3B, sets of horseshoe magnets 31 could be used instead of cross magnets 30. For even further temporary security, the magnets 30 (FIG. 3A) or 31 (FIG. 3B) could be electrified.

Referring to FIGS. 4, 5 and 6, with the patch 18 secured in the front panel 14, a bore 38 is drilled with a drill bit or hole saw 34, the open bore 20 now serving as a pilot hole for hole saw 34. The bore 38 accommodates a tap 36 which produces threads mating with the segments 40 of a threaded rod 10.

As seen in FIG. 6, a threaded segmented rod 10 includes a series of consecutive, externally threaded segments 40, each threaded segment 40 being separated by a reduced diameter core 42. The threaded segmented rod 10 has an unthreaded end 44 and a first segmented end 46. The unthreaded end 44 may be slotted, for example, to accommodate the blade of a screw driver, for screwing the first threaded segment 46 into a selected bore 38. End 44 may be turned manually to thread segment 46 into place and thus does not need to be configured to accommodate a tool. Alternatively, end 44 may be hexagonal in shape to be turned by a wrench, or may be otherwise suitably configured (e.g., quadrilaterally) to receive a tool. The depth or thickness 74 of each threaded segment 40 is equivalent to or slightly greater than the thickness of the patch 18 to provide inside and outside surfaces substantially flush with the inside and outside surfaces of panel 14 and patch 18 upon the completion of the repair. The core 42 between each threaded segment 40 has a predetermined length 76 which provides a core 42 physically strong enough to support the threaded segments 40 and yet allow the user access to a core 42 with a tool, such as a hack saw, to partially cut and weaken the core 42.

Figure 7:
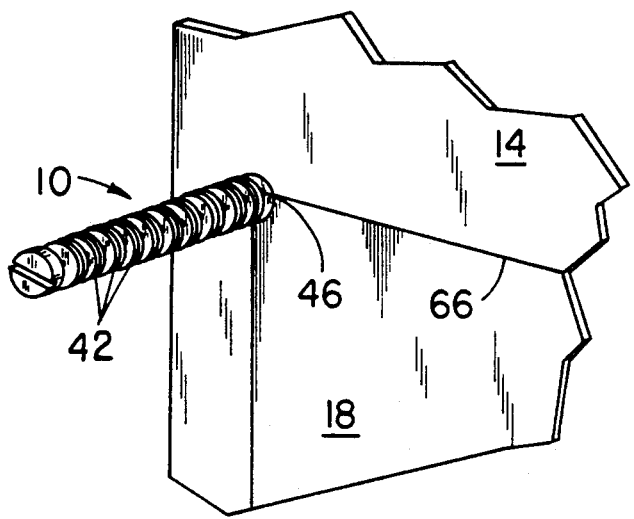
FIG. 7 is a perspective view showing the method and the apparatus of the present invention whereby the segmented rod is threaded into the tapped bore.
Figure 8:
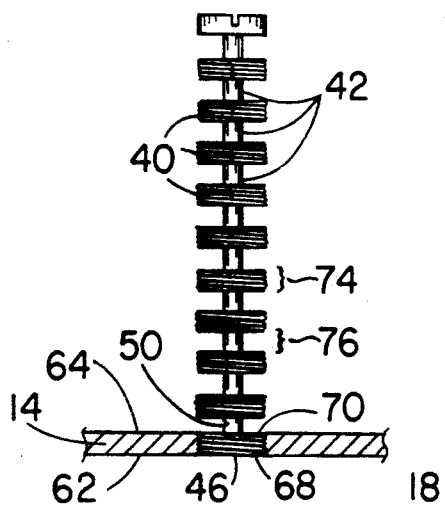
FIG. 8 is a cross-sectional elevational view of the method and apparatus according to the present invention whereby the segmented rod is threaded into the tapped bore and weakened at the core adjacent the surface, as by a hacksaw.

As shown in FIGS. 7 and 8, with the bore 38 tapped, the first segment 46 of the threaded segmented rod 10 is screwed into the hole 38 until the flush side 68 of the segment 46 is substantially flush with the inside surface 62 of the front panel 14 and the core side 70 of the first segment 46 is substantially flush with the outside surface 64 of the front panel 14, with the exception of the core 42 at this point. The core 42 is broken off substantially flush with the outside surface 64. Depending on the diameter of the core 42, this may require the core 42 to be weakened at 50, such as by cutting with a hack saw, for example.

Figure 9:
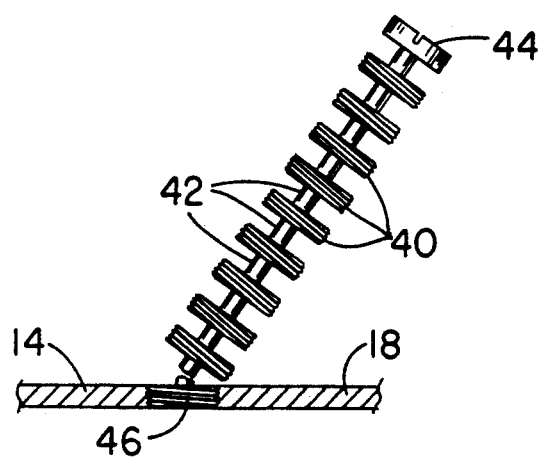
FIG. 9 is a cross-sectional elevational view of the method and apparatus according to the present invention whereby the segmented rod is broken off at the weakened area of the core adjacent the surface.
Figure 10:
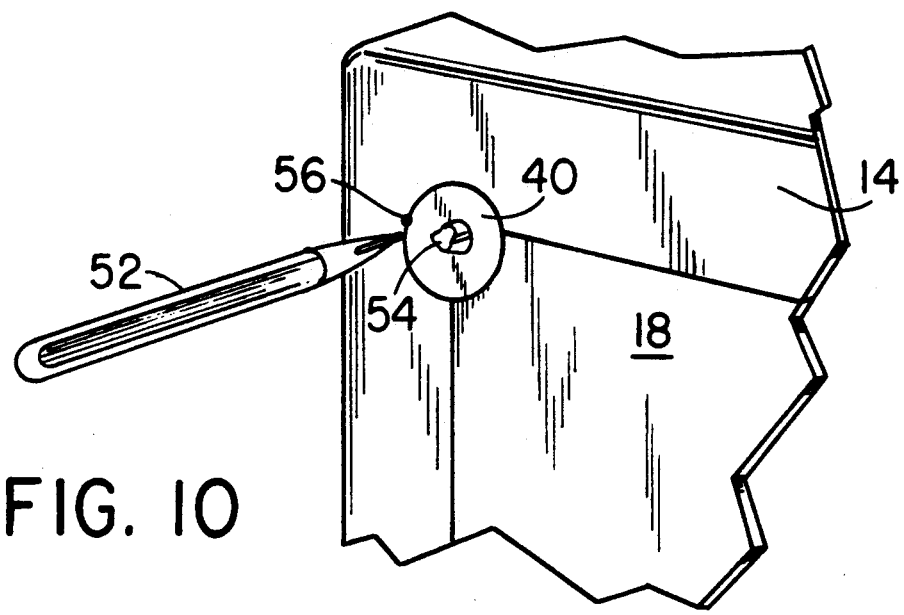
FIG. 10 is a perspective view of the method of the present invention whereby the segment is lodged into place by fouling its threads with the threads of the tapped bore, as by a center punch.
Figure 11:
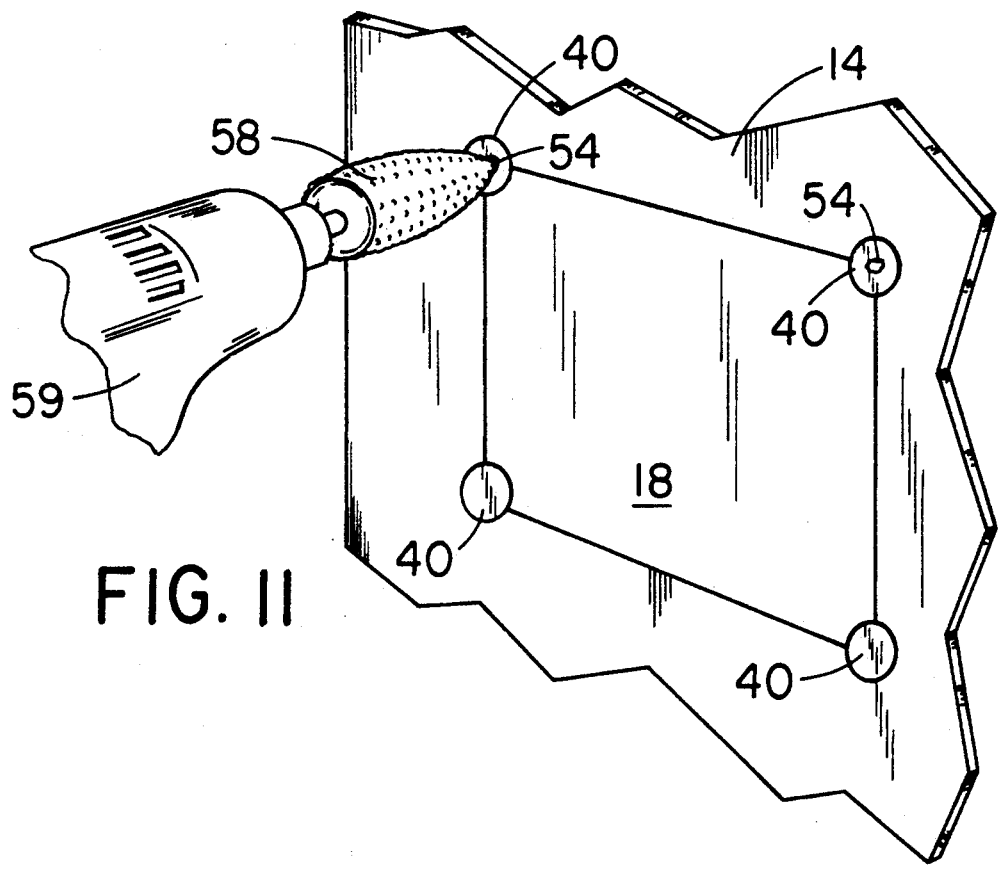
FIG. 11 is a view of the method and the apparatus of the present invention whereby the segment is ground smooth to be flush with the surface of panel and patch.

Referring now to FIGS. 10 and 11, with the segmented threaded rod 10 broken off substantially flush with the front panel 14, the threads of the threaded segment 40 are fouled with the threads of its bore 38 as by striking the edge area 56 of segment 40 with a center punch 52. Alternatively, a commonly available adhesive may be used to secure one or more segments in place, as is shown at 57 in FIG. 9. As a further alternative, some of the segments may have threads fouled as by use of a center punch 52 while others may be secured firmly by an adhesive, or all of the segments may be secured both by adhesive and by use of a center punch 52 to foul the segment and tapped bore threads.

With the threaded segments 40 secured as shown in FIG. 11, the fragment 54 of the core 42 can be ground smooth with the use of a grinder 58 and a hand drill 59. The first segment end 46 of the advancing segmented threaded rod 10 should be ground smooth prior to screwing of that segment end 46 into place. This will eliminate the need to grind the segment end 46 from within the console 12, behind panel 14. As thus far described, a rectangular patch 18 and mating hole 66 have been shown, with the patch 18 being secured in place by four segments 40, at the four corners of the patch 18. Clearly, additional bores 38 could be drilled, tapped and filled with additional segments 40, if desired. Also, obviously the panel hole 66 could be other than rectangular in configuration.

With reference to FIGS. 2A and 2B, the four corner bores 20 will be drilled before the patch 18 is temporarily installed as shown in FIG. 2B, ordinarily. Further referring to FIG. 2B, the upper left bore 20 is enlarged to bore 38, tapped, and filled with a segment 40. Thereafter, bolt 24 and its washers and nuts are removed from the lower, right corner of the patch and a second segment 40 is installed as just described. Next, the upper, right hand bolt 24 and its washers 26 and nut 28 are removed and a third segment 40 is installed. Finally, the lower, left hand bolt 24 and its washers 26 and nut 28 are removed and the final, fourth segment is installed. Of course, any other diagonal or peripheral step pattern of installing segments 40 could be adopted to accomplish the patching operation.

In one application of the herein disclosed and claimed invention, a panel made of standard 3/16" thick A36 structural steel plate was patched with a patch made of exactly the same material. Each segment plug was 3/15" thick and also made of the same A36 steel. The bores 38 were tapped and segments threaded to standard ⅜"-16-UNF designation with class 2 tolerances. Locktite Threadlocker brand adhesive was applied to the segment threads prior to installation. This adhesive is commonly available, has a gap fill capability of 0.07", and cures in a relatively short period of time, i.e., approximately 90% cure in about 24 hours. Again, it is readily appreciated that the present invention provides for panel patching requiring no sophisticated and relatively expensive tools and nothing other than available, off the shelf parts, with the sole exception of the threaded segmented rod 10.

Figure 12:
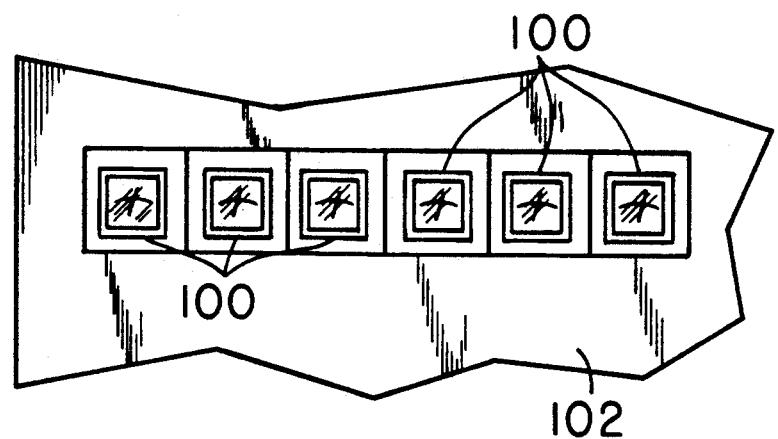
FIG. 12 is a partial, elevational view showing a long row of indicators or instruments, one of which is to be replaced by a patch according to the method of the present invention.
Figure 13:
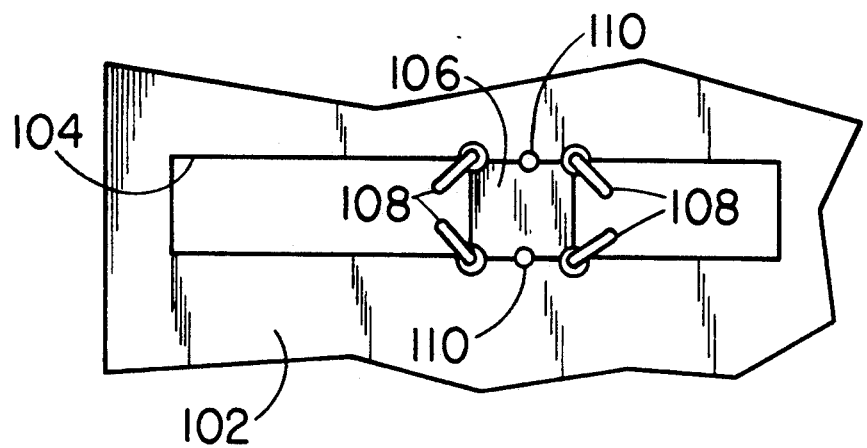
FIG. 13 is a view similar to FIG. 12, but showing the indicators removed and a patch temporarily secured in place.
Figure 14:
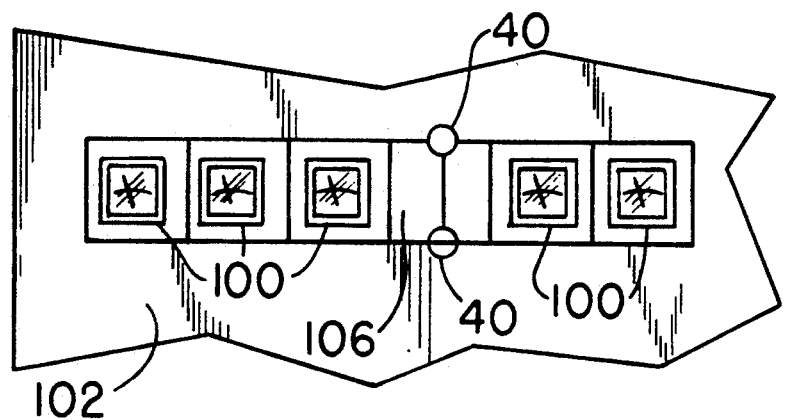
FIG. 14 is a view similar to FIG. 12, but showing the patching operation completed according to the method of the present invention and the remaining indicators or instruments replaced.

FIGS. 12-14 illustrate another application of the patching method of the present invention. In this instance, a mid bay patch 106 is to be installed intermediate a long row of indicators or instruments 100, conventionally mounted in a panel 102, to break the row of indicators into two groups. In FIG. 13, the instruments 100 have been removed, exposing the cutout 104. If desired, only a few of the instruments 100 may have to be temporarily removed to provide enough room to install a patch. A patch 106 is secured in place by four (or fewer) conventional C-clamps, screw vises or sandwich clamps 108. Pilot holes 110, similar to bores 20 and also about ¼" in diameter, are drilled through adjacent, peripheral edges of the cutout 104 and patch 106, intermediate the top and bottom edges of patch 106. The holes 110 are then enlarged, tapped and filled with segments 40, by the methodology previously described in detail, and the remaining indicators or instruments 100 are replaced. The result is a pair of groups of instruments or indicators 100, divided or separated by patch 106, as illustrated in FIG. 14.

It is to be understood that the present invention is not limited to the embodiments described above, but encompasses any and all embodiments within the scope of the following claims.

I claim:

1. A segmented rod for bonding two adjacent coplanar surfaces of substantially equal thickness together comprising:
   a solid, elongated, cylindrical member having a plurality of disc-shaped segments uniformly and closely spaced along its length; each of said disc-shaped segments having a flat top surface, a flat bottom surface substantially parallel to said flat top surface and a peripheral edge, each of said segments having a diameter substantially greater than the height of its peripheral edge;
   said cylindrical member having a diameter substantially smaller than the diameter of each segment;

said segments being substantially identical with one another; and external threading having a depth equal to the height of the peripheral edge on each peripheral edge of said segments; whereby said depth being equivalent to the thickness of one of the adjacent coplanar surfaces being bonded when the segmented rod is used, so that the top and bottom surfaces of a segment separated from said rod are flush, coplanar, flat, and continuous with both sides of the two adjacent coplanar surfaces being bonded, and corresponding portions of said cylindrical member separated from said rod are substantially flush, coplanar, flat, and continuous with both sides of the two adjacent coplanar surfaces being bonded.

2. The invention as claimed in claim 1, further comprising a head on said rod, said head being configured to accommodate a tool.

3. The invention as claimed in claim 2, said head being slotted to receive the blade of a screwdriver.

4. The invention of claim 1 wherein the space between each segment along said cylindrical member is shorter than the diameter of each segment.

* * * * *